US008901844B2

(12) United States Patent
Miller

(10) Patent No.: US 8,901,844 B2
(45) Date of Patent: Dec. 2, 2014

(54) LIGHTING DEVICE AND METHOD OF TRANSITIONING COLOR OUTPUTS

(75) Inventor: Bob Miller, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 813 days.

(21) Appl. No.: 13/053,458

(22) Filed: Mar. 22, 2011

(65) Prior Publication Data

US 2012/0242227 A1  Sep. 27, 2012

(51) Int. Cl.
  *H05B 37/02* (2006.01)
  *H05B 33/08* (2006.01)
  *B60Q 3/02* (2006.01)
(52) U.S. Cl.
  CPC .......... *H05B 33/0863* (2013.01); *B60Q 3/0293* (2013.01); *H05B 33/0827* (2013.01)
  USPC ............................... 315/291; 315/307; 315/84
(58) Field of Classification Search
  CPC .. B60Q 1/00; B60Q 2200/00; B60Q 2300/00; H05B 33/0827; H05B 33/0863; H05B 37/02
  USPC ...... 315/77, 84, 307, 308, 312, 185 R, 209 R, 315/291
  See application file for complete search history.

(56) References Cited

U.S. PATENT DOCUMENTS

| 6,417,863 | B1 | 7/2002 | Smith |
| 7,760,245 | B2 | 7/2010 | Ito et al. |
| 8,013,538 | B2 * | 9/2011 | Zampini et al. ............... 315/291 |
| 8,120,268 | B2 * | 2/2012 | Spartano et al. ............. 315/246 |
| 2008/0100697 | A1 | 5/2008 | Baker |

FOREIGN PATENT DOCUMENTS

| CN | 101929637 A | 12/2010 |
| WO | WO2009/024903 A2 | 2/2009 |

* cited by examiner

*Primary Examiner* — Jimmy Vu
(74) *Attorney, Agent, or Firm* — Vichit Chea; Price Heneveld LLP

(57) ABSTRACT

A vehicle lighting device and method of transitioning color output by a vehicle lighting device are provided. The method includes activating the lighting device to output a first color light, and deactivating the first color light. The method also includes the steps of generating an intermediate color light with the lighting device for a short time period. The method further includes the step of generating a second color light with the lighting device. Accordingly, the intermediate color light prevents the apparent generation of an undesirable intermediate color light.

21 Claims, 3 Drawing Sheets

LIGHTING DEVICE AND METHOD OF TRANSITIONING COLOR OUTPUTS

FIELD OF THE INVENTION

The present invention generally relates to lighting devices capable of producing multiple color light outputs, and more particularly relates to smooth color transitioning from one color to another color during color changes with the lighting device.

BACKGROUND OF THE INVENTION

Automotive vehicles are typically equipped with numerous lighting devices for use within the passenger compartment in the interior and on the body exterior. For example, lighting devices are commonly employed in the vehicle interior as foot wells lights, door lights, instrument panel cluster lights, scuff plates mounted lights, overhead dome lamps, cup holder lighting, storage bin lighting, tray lighting, as well as on the outside the vehicle as exterior puddle lamps, and various other lighting applications. In the past, vehicle lighting devices generally were configured to provide a predetermined color light output. More recently, vehicles have been equipped with lighting devices that may provide a plurality of light color options. A user may change from one light color to another light color to change the ambience within the vehicle passenger compartment or on the exterior of the vehicle.

Conventional lighting devices typically transition from one color light to another color light by simply turning off the first color light and immediately turning on the new second color light, typically within a very short time period. This relatively instant color change may cause the generation of a third intermediate color light. For example, when transitioning from red light to blue light, an undesirable purple color light may be visibly apparent to passengers within the vehicle. As such, this conventional light color transitioning may have a perceived undesirable effect.

Accordingly, it is desirable to provide for smooth light transitioning from one color light to another color light with a lighting device such as in a vehicle that does not provide an undesirable mixed color during the color change.

SUMMARY OF THE INVENTION

According to one aspect of the present invention, a lighting device is provided. The lighting device includes one or more light sources capable of producing a plurality of different light colors. The lighting device also includes a controller for controlling color output by the one or more light sources. The controller causes the one or more light sources to generate an intermediate color light for a short time period when transitioning between other different color lights.

According to another aspect of the present invention, a method of transitioning color outputs by a lighting device is provided. The method includes the steps of activating the lighting device to output a first color light and deactivating the first color light. The method also includes the step of generating an intermediate color light with the lighting device for a short time period. The method further includes the step of generating a second color light with the lighting device.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
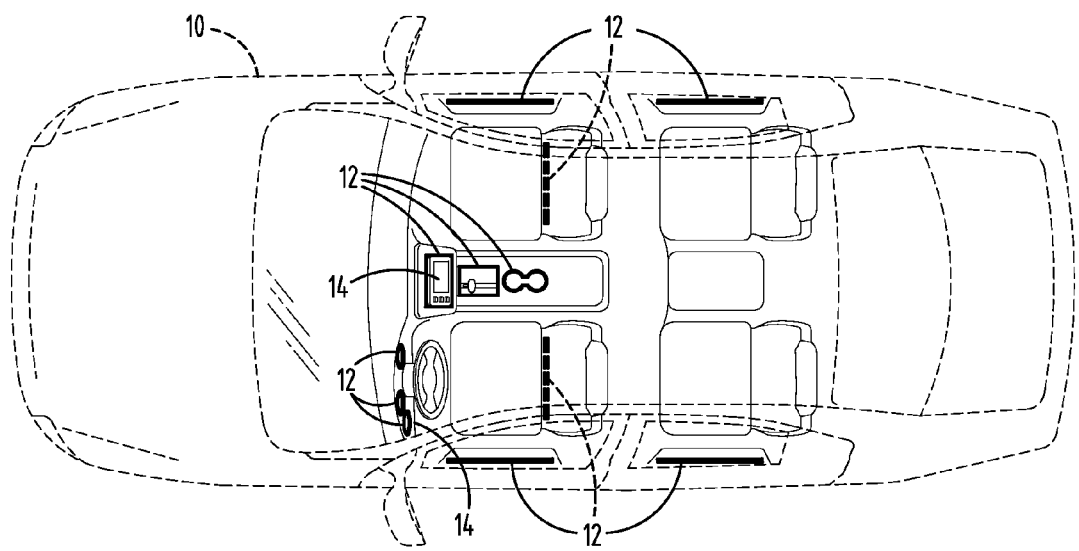
FIG. 1 is a schematic view of an automotive vehicle employing a plurality of lighting devices, according to one embodiment.

Referring to FIG. 1, an automotive vehicle 10 is generally illustrated having a plurality of lighting devices 12 assembled in various locations within the passenger compartment, according to one embodiment. The vehicle 10 may include a wheeled vehicle, such as a car, truck, ATV, or bus, a train, boat, airplane or other vehicle that may employ one or more lighting devices. The lighting devices 12 may include any of a number of lighting devices that provide ambient lighting either inside or outside of the vehicle 10 and may change light color outputs pursuant to a user input or application.

A plurality of exemplary lighting devices 12 are shown in FIG. 1 at various locations on board the vehicle 10. According to one embodiment, the lighting devices 12 may include one or more foot well lights, door lights, instrument panel cluster lights, scuff plate lights, overhead dome lamps, cup holder lights, storage bin lights, tray lights, and other interior lighting devices provided in the vehicle 10. According to other embodiments, the lighting devices 12 may include one or more lights employed on the exterior of the vehicle, such as puddle lamps and other lighting applications.

While the lighting devices 12 are shown and described herein assembled on a vehicle 10, it should be appreciated that the lighting devices 12 may be used in other applications. For example, the lighting devices 12 may be used on any lighting device capable of producing a change in light color output. For example, the lighting devices 12 may be useful in a home environment to serve as nightlights, indicator lights for appliances, and other applications. Further, it should be appreciated that the lighting devices 12 may be used in other applications including indicator lights for mobile devices, signal indicator lights for street lights, and various other applications.

It should be appreciated that one or more lighting devices 12 may be configured to provide for a plurality of light color options such that a user or an application, such as a programmed routine, may change the lighting output from one light color to another light color to change the ambiance such as within the vehicle passenger compartment or on the exterior of the vehicle 10. The one or more lighting devices 12 may be controlled by a user via one or more user input interfaces 14. The user input interfaces 14 may include one or more manually actuatable switches, such as toggle switches, capacitive switches, and other known switches for turning lights on and off and for changing light color. According to other embodiments, the user input interface 14 may include touch screen inputs available on electronic devices such as a navigation display 14 or smartphone. It should further be appreciated that the lighting devices 12 may be changed pursuant to applications that may be controlled by programmed routines, independent of input manual control by a user.

In the embodiment shown, the vehicle 10 has a plurality of vehicle lighting devices, each of which are controlled to provide a smooth aesthetically pleasing color transition between different light colors during a light color change. Each of the vehicle lighting devices 12 includes one or more light sources capable of producing a plurality of different light colors. Each lighting device 12 may include a plurality of light-emitting diodes (LEDs) commonly packaged into a single LED package, according to one embodiment. According to one example, the LED package may include three colored LEDs, namely a red diode, a green diode, and a blue diode that may generate individual red, green and blue light outputs, respectively, and may mix the colors to provide other light output colors. For example, mixing the red, green and blue light colors together in approximately equal proportions may produce a known white light output that may serve as the transitional color. Many color variations are achievable by selecting different color combinations in various proportioned light intensities. It should be appreciated that other light sources may be employed to provide for the different light color outputs.

Figure 2:
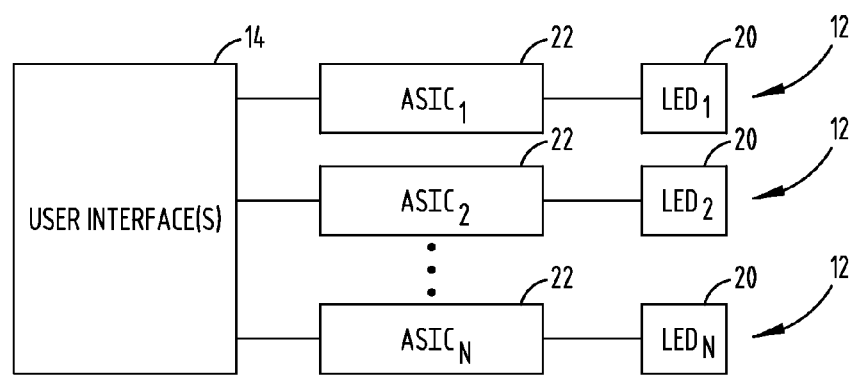
FIG. 2 is a block diagram illustrating a lighting device control system for controlling the transitioning of color outputs by lighting devices, according to one embodiment.

Referring to FIG. 2, a plurality of lighting devices 12 are shown each having one or more light sources 20 labeled as $LED_1$ through $LED_N$. In this embodiment, the lighting sources labeled $LED_1$ through $LED_N$ are individual LED light packages that are capable of producing a plurality of different light colors. Each lighting source 20 is shown controlled by a controller shown as an application specific integrated circuit (ASIC) 22. A plurality of ASICs 22 are shown labeled as $ASIC_1$ through $ASIC_N$ for controlling the light color output generated by the plurality of light sources labeled $LED_1$ through $LED_N$, respectively. Each ASIC 22 is a controller made up of control circuitry that allows for the control of the light color output by the corresponding one or more light sources. The controller causes the one or more light sources 20 to generate a transitional intermediate color light for a short time period when transitioning between different light colors. This may be in response to a user input interface 14 providing control signals to the corresponding control circuitry 22. While individual ASIC controllers 22 are shown and described herein, it should be appreciated that other control circuitry such as one or more microprocessors may be employed as the controller to control the light color output of the one or more light sources 20.

Figure 3:
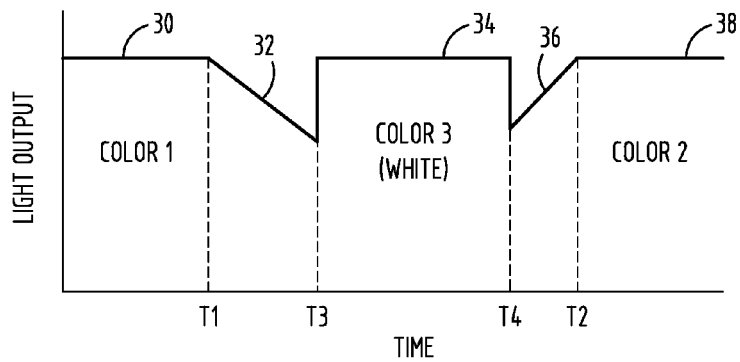
FIG. 3 is a timing diagram illustrating the application of a transitional intermediate color for the color transitioning, according to one embodiment.

Referring to FIG. 3, control of the light color output by the one or more light sources 20 is illustrated, according to one embodiment. In this embodiment, the controller controls the one or more light sources 20 to generate a first color having a light output amplitude 30, shown as color 1, in response to a control signal. When a color change is requested to change from color 1 to color 2, the controller causes the one or more light sources 20 to generate a transitional intermediate light color, shown labeled as color 3, for a short time period after deactivating the starting light color 1 and prior to activating the final desired light color 2. As shown, color 1 is deactivated at time T1 and shown turning off on ramped light output 32 from time T1 to T3. At time T3, the controller generates a control signal to generate a known intermediate third color light (color 3), which may be a predetermined white light, to be produced as shown by light output 34 from time T3 to T4. The intermediate white light is activated only for a short time period, such as less than five seconds, according to one embodiment, and more preferably for a short time period less than two seconds. In one embodiment, the intermediate white light is activated for a short time period in the range of 20 milliseconds to 500 milliseconds, and is then turned off at time T4. At time T4, the second light color (color 2) is turned on and color 2 ramps up light output on line 36 to its full on light output on line 38 at time T2 pursuant to control signals. By introducing the intermediate white light (color 3), the white light substantially eliminates or masks light mixing which may occur when transitioning between color 1 and color 2 as to avoid the generation of other potentially undesirable perceived colors.

It should be appreciated that the one or more light sources 20 may be controlled to turn on (activated) and off (deactivated) by controlling the voltage or current applied to the lighting sources. It should further be appreciated that the amplitude of the light sources 20 may be controlled using pulse width modulation control or current control. The intermediate light is activated following deactivation of the first color within a time period of 10 to 500 milliseconds, according to one embodiment. Further, the intermediate light color is turned off (deactivated) and the third color light is activated within a time period of 10 to 500 milliseconds following turning off the intermediate light color, according to one embodiment.

Figure 4:
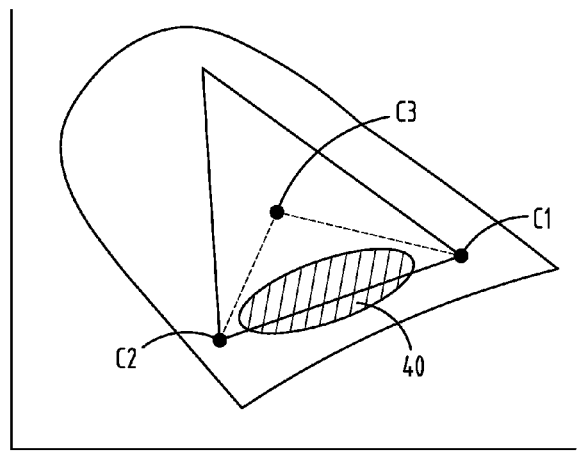
FIG. 4 is a graph illustrating the effect of transitioning to the intermediate color, according to the present invention.

Referring to FIG. 4, the effective transitioning to the intermediate color light between light color changes is shown. As seen in FIG. 4, absent the intermediate color light, a transition would occur directly from color 1 (C1) to color 2 (C2) that would pass through a mixed color region 40 based on the chromaticity chart. For example, if transitioning from a red color to a blue color, an overlap in the visually apparent perceived color would typically occur and in this example would produce a purple light color in region 40. By intentionally injecting a predetermined intermediate light color shown as color 3 (C3), the generation of an undesired mixed color in region 40 is avoided such that a smooth color transition occurs when transitioning from first light color C1 to a different second light color C2. In one embodiment, the predetermined intermediate color is a white light. However, it should be appreciated that predetermined colors may be used as the intermediate color, according to other embodiments.

Figure 5:
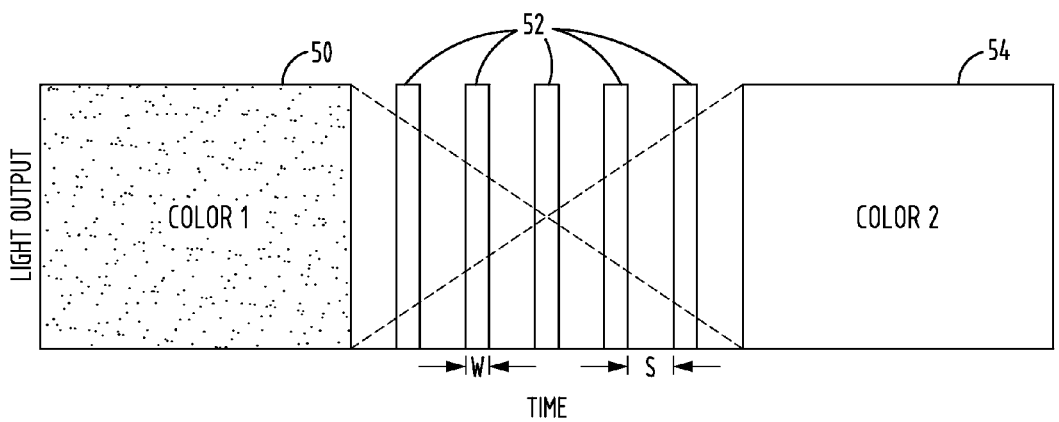
FIG. 5 is a timing diagram illustrating a pulsed application of an intermediate light color, according to another embodiment.

Referring to FIG. 5, a light color transition from light color 1 to light color 2 is shown using a pulsed intermediate color, according to another embodiment. In this embodiment, a light color change transition from light color 1 to light color 2 occurs by transitioning through the intermediate white light color 52 which is pulsed a plurality of times. According to one embodiment, five pulses may be provided within a time period of less than five seconds, more preferably less than two seconds, and more preferably within a time period of 20 to 1,500 milliseconds. In doing so, the intermediate color light 52 is pulsed on and off a plurality of times to provide the intermediate color such that the undesirable color mixing between light colors 1 and 2 is avoided or sufficiently masked to provide a smooth color transition. The intermediate color light 52 may be pulsed at a frequency in the range of 0.2-5000 Hz, according to one embodiment. Each intermediate light pulse may have a time width W of about 20 milliseconds, and pulses are spaced by time S of about 20 milliseconds, according to one example. The intermediate color pulses can be in the range of about 5 microseconds to 1 second.

Figure 6:
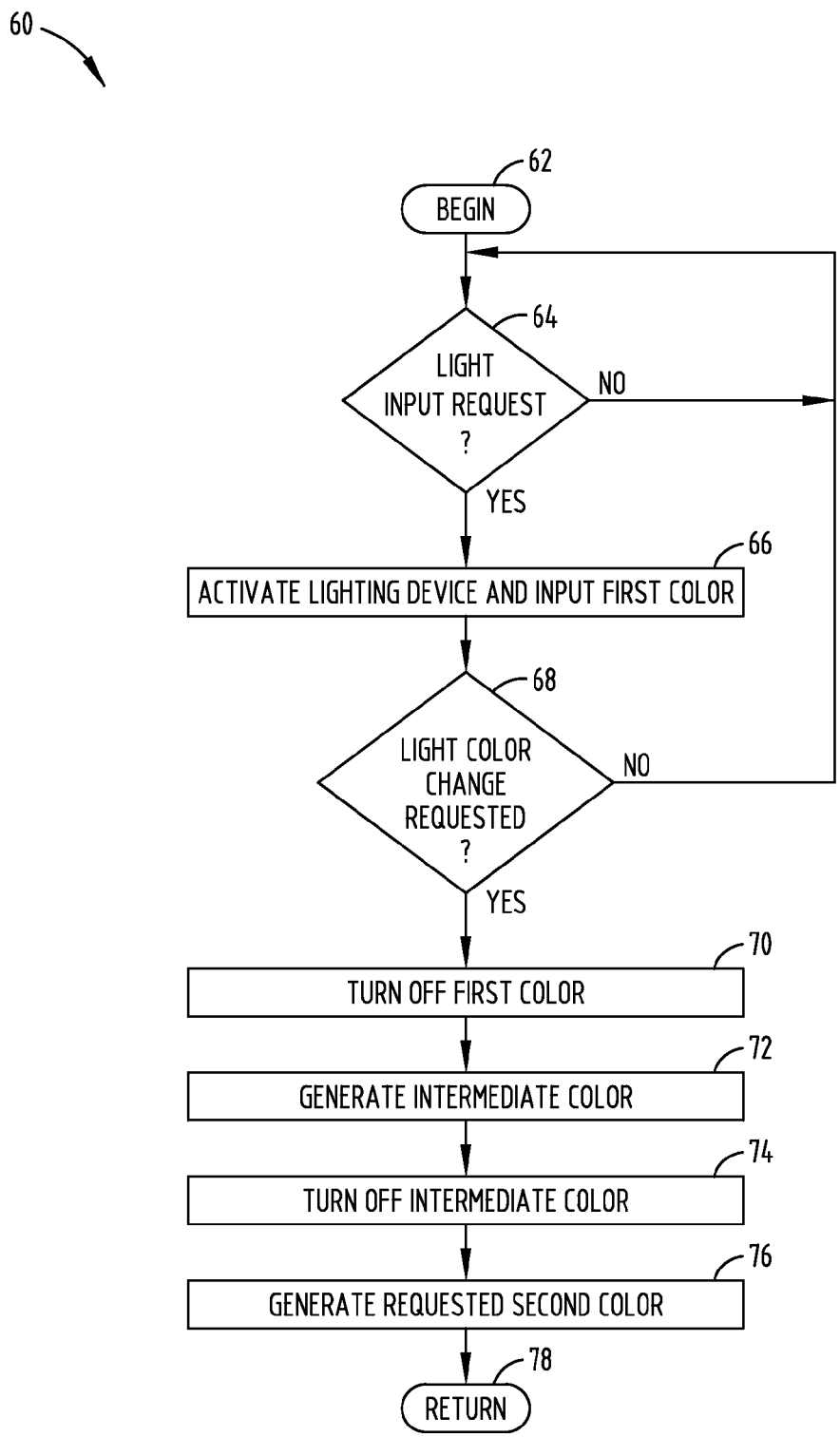
FIG. 6 is a flow diagram illustrating a method of transitioning light color outputs of a lighting device, according to one embodiment.

Referring to FIG. 6, a method 60 of controlling a vehicle lighting device to smoothly transition between light color outputs is illustrated, according to one embodiment. The method 60 begins at step 62 and proceeds to decision step 64 to determine if a light input request has been received. If the light input request has not been received, routine 60 defaults back to the beginning 62. If a light input has been received, method 60 proceeds to step 66 to activate the lighting device and to input the first light color selected. Method 60 then looks for a light color change request at decision step 68 and, if no such request exists, returns. If a light color change has been requested, method 60 proceeds to step 70 to turn off the first color light, and thereafter generates an intermediate color light at step 72. The intermediate color light is only activated for a short period of time such that it is turned off at step 74 within a time period of less than two seconds. Following activation and deactivation of the intermediate color light, method 60 proceeds to step 76 to generate the requested second color before returning at step 78. Accordingly, the generation of the predetermined intermediate third color masks undesirable mixing of light colors that may otherwise occur during the transition from one light color to another light color.

Accordingly, the vehicle lighting device 12 and method 60 of transitioning light color outputs of a vehicle lighting device provides a smooth transition between different light output colors in a manner that prevents or masks undesirable color mixing. As such, the color transition produces a standard translational color to provide for a desirable ambient lighting experience. It should be appreciated that the specific lighting devices and methods illustrated in the attached drawings and described in the specification are simply exemplary embodiments of the inventive concept defined in the appended claims. Hence, specific dimensions and other physical characteristics relating to the embodiments disclosed herein are not to be considered as limiting, unless the claims expressly state otherwise.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A lighting device comprising:
   one or more light sources capable of producing a plurality of different light colors; and
   a controller for controlling color output by the one or more light sources, said controller causing the one or more light sources to generate an intermediate color light for a short time period when transitioning between other different color lights.

2. The lighting device of claim 1, wherein the one or more light sources comprises one or more light-emitting diodes (LEDs).

3. The lighting device of claim 1, wherein the intermediate color light is a white light.

4. The lighting device of claim 1, wherein the intermediate color light is activated for a short time period that is less than 5 seconds.

5. The lighting device of claim 1, wherein the intermediate color light is activated for a short time period that is less than 2 seconds.

6. The lighting device of claim 5, wherein the intermediate color light is activated following deactivation of a first color light within a time period of 10 to 500 milliseconds.

7. The lighting device of claim 6, wherein the intermediate color light is turned off and a second color light is activated within a time period of 10 to 500 milliseconds following turning off the intermediate color light.

8. The lighting device of claim 1, wherein the intermediate color light is pulsed on and off a plurality of times.

9. The lighting device of claim 1, wherein the lighting device is assembled on a vehicle.

10. The lighting device of claim 9, wherein the one or more light sources provide ambient lighting to a vehicle.

11. A method of transitioning color outputs by a lighting device comprising:
    activating the lighting device to output a first color light;
    receiving a request for a change to a second color light:
    deactivating via a controller the first color light;
    generating via the controller an intermediate color light with the lighting device for a short time period; and
    generating the second color light with the lighting device.

12. The method of claim 11, wherein the step of activating the lighting device comprises activating one or more light-emitting diodes (LEDs).

13. The method of claim 11, wherein the step of generating an intermediate color light comprises generating an intermediate white light.

14. The method of claim 11, wherein the step of generating the intermediate color light comprises generating the intermediate color light for a short time period is less than 5 seconds.

15. The method of claim 11, wherein the step of generating the intermediate color light comprises generating the intermediate color light for a short time period less than 2 seconds.

16. The method of claim 11, wherein the step of generating an intermediate color light comprises pulsing the intermediate color light.

17. The method of claim 11, wherein the step of generating an intermediate color comprises generating the intermediate color for a time period in the range of 20 to 500 milliseconds.

18. The method of claim 17, wherein the step of generating an intermediate color comprises generating the intermediate color within a time period of 20 to 500 milliseconds following deactivation of the first color.

19. The method of claim 18, wherein the step of generating a second color light comprises generating the second color light within a time period of 20 to 500 milliseconds following deactivation of the intermediate color light.

20. The method of claim 11, wherein the lighting device is assembled on a vehicle.

21. A vehicle lighting device comprising:
    a light source capable of producing a plurality of different light colors on a vehicle; and
    a controller controlling color output by the light source and causing the light source to generate a first color light and subsequently a second color light in response to a light color change request and an intermediate color light for a short time period when transitioning between the first and second color lights.

* * * * *